United States Patent [19]
Lubetzky et al.

[11] 3,731,878
[45] May 8, 1973

[54] AGRICULTURAL SPRAYER

[75] Inventors: Jacob Lubetzky, Tel Aviv; Zeev Svavolski, Ramat Hasharon, both of Israel

[73] Assignee: Resses Limited, Tel Aviv, Israel

[22] Filed: Oct. 27, 1971

[21] Appl. No.: 192,878

[52] U.S. Cl..............................239/166, 239/261
[51] Int. Cl..............................B05b 3/06
[58] Field of Search..............239/159, 160, 161, 239/162, 164, 166, 225, 227, 251, 253, 247, 261, 264, 265, 97, 587; 287/3, 14

[56] References Cited

UNITED STATES PATENTS

| | | | |
|---|---|---|---|
| 2,590,400 | 3/1952 | Gollnick | 239/166 |
| 2,032,369 | 3/1936 | Kilpatrick | 239/97 |
| 349,087 | 9/1886 | Dennis | 239/164 X |
| 1,495,821 | 5/1924 | Tull | 287/14 X |
| 2,411,964 | 12/1946 | Grass | 239/162 X |
| 370,922 | 10/1887 | Best | 239/261 |
| 1,232,208 | 7/1917 | Buckner | 239/261 |
| 2,363,776 | 11/1944 | Dale | 239/160 X |
| 1,603,203 | 10/1926 | Hanburry | 281/14 X |
| 1,604,870 | 10/1926 | Asman | 287/14 |

FOREIGN PATENTS OR APPLICATIONS

| | | | |
|---|---|---|---|
| 22,157 | 9/1930 | Australia | 239/247 |

Primary Examiner—Allen N. Knowles
Assistant Examiner—Michael Mar
Attorney—Alan G. Carlson et al.

[57] ABSTRACT

An agricultural sprayer for spraying liquid chemicals, insecticides, and the like, onto trees, shrubs, vines, or fieldcrops, in a continuously turbulent spray so that all the leaves are continuously agitated and therefore are sprayed on all their surfaces. The sprayer apparatus includes a support carrying at least two nozzles which are in communication with a pump supplying a spraying liquid. The support is adapted to rotate about an arm owing to the reaction of the spray and it is angularly adjustable relative to the arm. The arm is angularly adjustable relative to a bar which is adapted to be removably mounted to a pipe or for longitudinal travel between rows of the agricultural crop to be sprayed.

8 Claims, 2 Drawing Figures

PATENTED MAY 8 1973　　　　　　　　　3,731,878

AGRICULTURAL SPRAYER

BACKGROUND OF THE INVENTION

1. Field of the Invention

The present invention concerns an agricultural sprayer for the spraying of liquid chemicals, e.g. insecticides, fungicides and the like, onto trees, shrubs, vines, field crops or any other plants which have leaves and are grown in rows.

2. Description of the Prior Art

Self-propelling sprayers or sprayers drawn by a tractor are known. They all comprise elements whose function it is to distribute the liquid spray onto the tree, which for the purpose of this specification is meant to include all the above-mentioned plants. Some sprayers include manually operable spray-guns. Others comprise a plurality of nozzles cooperating with a blower or turbine wheel, whereby the ejected liquid is carried by the air stream emanating from the blower or turbine as a spray to the trees. There are still others in which a horizontally or vertically arranged rigid pipe is provided with a plurality of nozzles along its length through which the spraying liquid is ejected. The pipe is mounted so that it can oscillate slightly whereby the nozzles and thus the spray receive a reciprocating motion in order to cover a larger spraying surface.

A great drawback of all the known sprayers is the fact that they do not cause the spray to penetrate into the leafy part of the tree. Although the spray is ejected at great pressure, only the top leaves of a tree are sprayed, since the spray comes from a source which moves linearly only, i.e. as the sprayer is drawn between a row of trees. Moreover, in order to cover a large area a great number of nozzles are required. A further drawback of the known sprayers is their complicated construction and thus their high manufacture and maintenance cost.

It is the object of the present invention to provide a sprayer which overcomes the above-mentioned drawbacks of the known sprayers in that it is of simple construction and effects a continuously turbulent spray onto the tree whereby all the leaves are moved permitting them to be covered by spray on all their surfaces.

SUMMARY OF THE INVENTION

The invention consists of an agricultural sprayer apparatus including a support carrying at least two nozzles which are in communication with a pump supplying a spraying liquid. The support is adapted to rotate about an arm owing to the reaction of the spray emanating from the nozzles and it is angularly adjustable relative to a pipe which is mounted to a carriage for longitudinal travel between rows of an agricultural crop.

In a preferred embodiment of the invention, the arm is pivotally mounted to sleeves adjustably fixed to the pipe extending from a carriage on which the pump is mounted.

DESCRIPTION OF THE PREFERRED EMBODIMENT

Figure 1:
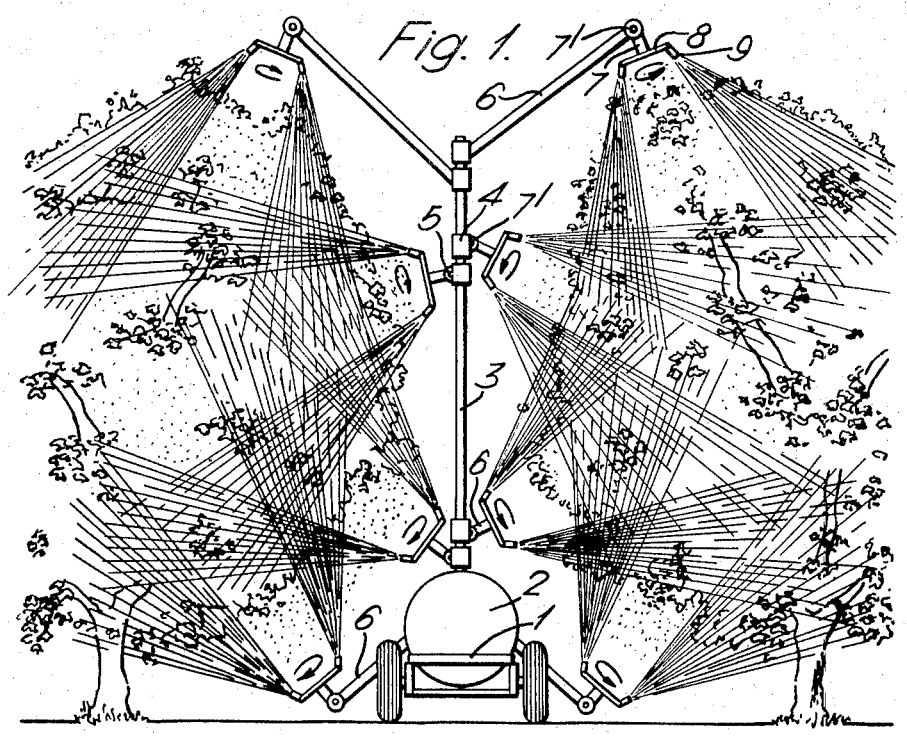
FIG. 1 is a schematic front elevation of a sprayer according to the invention in the process of spraying between two rows of trees.

The agricultural sprayer is mounted on a carriage 1 on which the tank for the spraying liquid and the pump, both indicated schematically by 2, are located. From this carriage, extending vertically upwardly is a pipe or bar 3 along which a number of sleeves 4 are fixable at different levels. Pipe 3 may be mounted on the carriage in such a manner that it can be adjusted from its vertical to a horizontal or angular position. Pivotally attached to each sleeve at 5 is an arm 6, at the outer end of which a support for carrying nozzles is located. The support includes a short sleeve 7 pivotally mounted at 7' and a pipe 8 rotatably mounted at its center to the axis of sleeve 7 and carrying at its end nozzles 9. If desire, pipe 8 may be integral with sleeve 7 and rotate therewith about the pivotal connection 7'. The pivotal connection 7' is effected by well-known means.

The supply of the spraying liquid from the pump 2 to the nozzles is effected by a flexible pipe (not shown) which leads through sleeve 7 and pipe 8 to nozzles 9.

The spraying of high pressure liquid through nozzles 9 causes the rotation of pipe 8 owing to the reactive forces of the sprays. This causes turbulence in the leaves of the trees so that the leaves are all moved continuously whereby they can be sprayed on all their surfaces. And further, in view of the fact that the spray at different levels may be adjusted at different angles owing to the pivotal connection of arms 6 and sleeve 7, all the leaves on at least the side of the trees facing the sprayer will be covered by spraying liquid.

If desired, the mounting of the nozzles 9 may be made angularly adjustable relative to pipe 8 so that different speeds of spray can be effected.

If desired, the spray liquid supply to the nozzles may be effected through pipe 3 through sleeves 4, arms 6 and sleeve 7 in which case the position of sleeves 4 will have to be fixed permanently and cannot be made adjustable.

Figure 2:
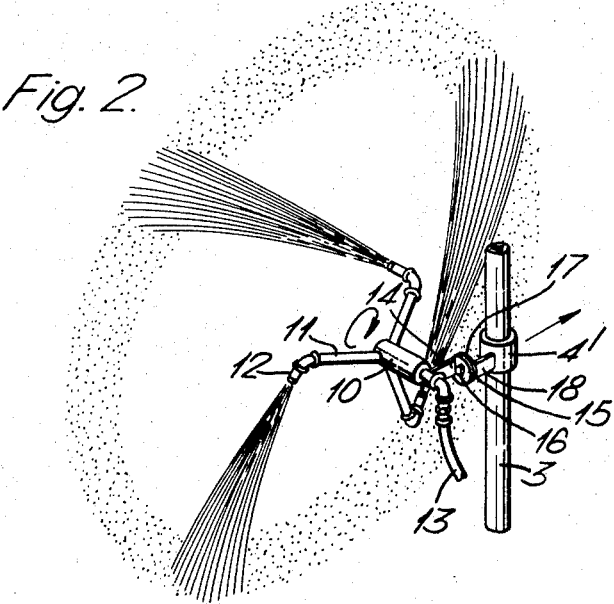
FIG. 2 is a perspective partial view of a second embodiment of the invention.

In FIG. 2, the sleeve 7, pipe 8 and nozzles 9 are replaced by a rotatable sleeve 10 from which at equal angular spacing pipes 11, carrying at their ends nozzles 12 extend. A pipe 13 supplying spraying liquid leads into sleeve 10 and is mounted on a short arm 14 extending from the surface of a circular plate 15 which is mounted by a screw 16 to a second circular plate 17. The two plates 15 and 17 are angularly adjustable relative to each other by means of screw 16. Short arm 14, rotatable sleeve 10, and pipes 11 comprise the support for nozzles 12.

Extending from the outer surface of plate 17 is a short arm 18 fixedly mounted to a sleeve 4' fixed to pipe 3. Sleeve 4' is moveable with respect to pipe 3. Arm 18 could be made to be angularly adjustable with respect to sleeve 4'. Nozzles 12 are angularly adjustable relative to pipes 11, whereby the direction of the spray and its speed can be adjusted.

Instead of being mounted at the ends of pipes 8 or 11, respectively, nozzles 9 or 12 may be mounted in the circumference of a circular plate which will be rotatable on or with pipe 7 or 10, respectively, as the case may be.

It is further possible to provide more than three nozzles on such a plate or as an alternative to provide more than three nozzles on a pipe 10 such as described in FIG. 2.

It is further possible to make pipe 3 telescopically extensible either by a hydraulic or mechanical power source or by the spray liquid itself and to mount spray nozzles to the outermost pipe of said telescopic arrangement. In this case, of course, the upper part of the tree only will receive spraying liquid.

What is claimed is:

1. An agricultural sprayer apparatus attachable to a carriage having a tank and a pump for supplying liquid from said tank, comprising:
   a. a pipe adapted to be removably mounted for longitudinal travel between rows of agricultural crops having foliage;
   b. an arm;
   c. means mounting said arm to said pipe for angular adjustable movement of said arm with respect to said pipe;
   d. support means;
   e. first means mounting said support to said arm for angular adjustable movement of said support with respect to said arm;
   f. second means mounting said support for rotation of said support with respect to said arm; and
   g. at least two nozzles mounted to said support such that when liquid emanates from said nozzles said support will be caused to rotate with respect to said arm
   h. whereby said arm and said support means are adjustable to direct turbulent spray from said rotating nozzles for agitating said foliage of said crop and thereby spraying said foliage on all of its surfaces.

2. The sprayer of claim 1 wherein said support includes a pipe and a sleeve mounting the pipe at said pipe's center, said pipe carrying one of said nozzles at each end thereof, said sleeve being mounted to said arm by said first means mounting said support and said second means mounting said support.

3. The sprayer of claim 1 wherein said support includes a pipe and a sleeve mounting the pipe at said pipe's center, said pipe carrying one of said nozzles at each end thereof, said sleeve being mounted to said arm by said first means mounting said support, and said pipe being mounted to said sleeve by said second means mounting said support.

4. The sprayer of claim 1 wherein said support includes at least two pipes carrying one of said nozzles at each outer end and extending radially from a sleeve which is mountable by said first mounting means to said arm.

5. The sprayer of claim 1 wherein said support includes a circular plate for mounting said nozzles at said plates circumference.

6. The sprayer of claim 1 wherein said means mounting said arm to said pipe includes a sleeve adjustably affixed to said pipe.

7. The sprayer of claim 5 further including a flexible pipe for the supplying of said liquid to said support.

8. The sprayer of claim 5 wherein said pipe contains means for supplying said liquid to said support.

* * * * *